United States Patent [19]

Bronstert et al.

[11] 4,089,824

[45] May 16, 1978

[54] HOT-MELT PRESSURE-SENSITIVE ADHESIVES BASED ON BLOCK COPOLYMERS

[75] Inventors: Klaus Bronstert, Carlsberg; Volker Ladenberger, Schwetzingen; Wolfgang Druschke, Dirmstein; Wolfgang Groh, Mannheim; Helmut Mueller, Kaiserslautern, all of Germany

[73] Assignee: BASF Aktiengesellschaft, Ludwigshafen, Germany

[21] Appl. No.: 733,525

[22] Filed: Oct. 18, 1976

[30] Foreign Application Priority Data

Nov. 11, 1975 Germany .................. 2550546

[51] Int. Cl.$^2$ .................. C08L 9/00; C08L 9/06; C08L 45/02; C08L 93/04
[52] U.S. Cl. .................. 260/27 BB; 260/23 S; 260/23.3; 260/23.7 M; 260/27 R
[58] Field of Search .......... 260/27 BB, 27 R, 23.7 M, 260/23 S, 23.3

[56] References Cited

U.S. PATENT DOCUMENTS

| | | | |
|---|---|---|---|
| 3,113,986 | 12/1963 | Breslow et al. | 260/96 HY |
| 3,427,269 | 2/1969 | Davis et al. | 260/27 BB |
| 3,700,633 | 10/1972 | Wald et al. | 260/96 HY |
| 3,736,281 | 5/1973 | Russell | 260/27 R |
| 3,753,936 | 8/1973 | Marrs | 260/27 R |
| 3,917,607 | 11/1975 | Crossland et al. | 260/27 BB |
| 3,932,327 | 1/1976 | Naylor | 260/27 BB |
| 3,987,002 | 10/1976 | Lakshmanan | 260/880 B |
| 3,993,613 | 11/1976 | Doss et al. | 260/27 BB |

FOREIGN PATENT DOCUMENTS

| | | |
|---|---|---|
| 956,189 | 10/1974 | Canada. |
| 985,614 | 3/1965 | United Kingdom. |
| 1,020,720 | 2/1966 | United Kingdom. |
| 1,343,734 | 1/1974 | United Kingdom. |
| 1,405,786 | 9/1975 | United Kingdom. |

*Primary Examiner*—Ronald W. Griffin
*Attorney, Agent, or Firm*—Keil, Thompson & Shurtleff

[57] ABSTRACT

Hot-melt pressure-sensitive adhesive composition based on a rubbery block copolymer of a monovinyl-aromatic compound or monovinylidene-aromatic compound and butadiene.

The composition contains a selectively hydrogenated radial block copolymer with terminal polymer blocks of the monovinyl- or mono-vinylidene-aromatic compound and, in the middle position, butadiene-based polymer blocks which had a 1,2-vinyl content of from 30 to 70 per cent by weight prior to hydrogenation. The compositions may be used, in particular, for the production of self-adhesive materials.

2 Claims, No Drawings

HOT-MELT PRESSURE-SENSITIVE ADHESIVES BASED ON BLOCK COPOLYMERS

The invention relates to hot-melt pressure-sensitive adhesives based on a rubbery radial block copolymer of a monovinyl-aromatic or monovinylidene-aromatic compound and butadiene, wherein the olefinic double bonds are selectively hydrogenated.

It is known that rubbery block copolymers of a monovinyl-aromatic compound and a conjugated diene can be used for the manufacture of pressure-sensitive adhesive compositions. In addition to the block copolymer, these compositions in general contain one or more tackifier resins, for example rosin derivatives, coumarone-indene resins and the like, and a rubber extender oil, with or without antioxidants and other fillers (cf. German Laid-Open Application DOS 1,966,431).

U.S. Pat. No. 3,753,936 discloses pressure-sensitive adhesive compositions which contain, as the rubbery block copolymer, a radial or branched-chain block copolymer of a monovinyl-aromatic compound and a conjugated diene with terminal non-elastomeric polymer blocks of the monovinyl-aromatic compound and elastomeric polymer blocks of the conjugated diene in the middle position. These pressure-sensitive adhesive compositions, which are in particular intended for application from solution or dispersion, show improved properties compared to similar compositions which contain a corresponding linear block copolymer, and in particular possess high creep resistance, but are not entirely satisfactory in respect of other essential properties, above all cohesion.

Further, German Laid-Open Applications DOS 1,594,267 and 2,246,036 disclose the use of selectively hydrogenated rubbery block copolymers of a monovinyl-aromatic compound and a conjugated diene in pressure-sensitive adhesive compositions. Though, according to the description in German Laid-Open Application DOS 2,246,036, it is in principle possible to use branched block copolymers, the said reference in fact, like German Laid-Open Application DOS 1,594,267, only describes linear block copolymers and their use for the manufacture of pressure-sensitive adhesive compositions. It is true that pressure-sensitive adhesive compositions which contain such selectively hydrogenated, linear block copolymers of a monovinyl-aromatic compound and a conjugated diene show adequate tackiness even at fairly high temperatures, but the peel strength of the bonds obtained with such mixtures leaves much to be desired.

It is an object of the present invention to provide a hot-melt pressure-sensitive composition which exhibits good adhesion properties, tackiness, creep resistance and aging resistance, and is in particular distinguished by good cohesion and good peel strength.

We have found that this object is achieved, surprisingly, by a pressure-sensitive adhesive composition based on a rubbery block copolymer, of a particular structure, obtained from a monovinyl-aromatic or monovinylidene-aromatic compound and a conjugated diene which possesses radial branching, and of which the olefinic double bonds are selectively hydrogenated.

Accordingly, the present invention relates to a pressure-sensitive adhesive comprising a mixture of (a) 100 parts by weight of a rubbery, radial block copolymer with terminal non-elastomeric polymer blocks of a monovinyl-aromatic or monovinylidene-aromatic compound and butadiene-based elastomeric polymer blocks in the middle position, the olefinic double bonds of the branched block copolymer having been reduced to a residual content of less than 5% by selective hydrogenation and the elastomeric polybutadiene blocks having had, prior to hydrogenation, a 1,2-vinyl content of from 30 to 70% by weight, based on the said blocks, and the number-average molecular weight of the branched block copolymer being from 30,000 to 300,000, (b) from 25 to 300 parts by weight of a tackifier resin and (c) from 0 to 200 parts by weight of a rubber extender oil.

The rubbery radial block copolymers to be employed according to the invention form the essential elastomeric constituent of the adhesive. Examples of monovinyl-aromatic and monovinylidene-aromatic compounds which may be used to synthesize the terminal non-elastomeric polymer blocks of the branched block copolymers are styrene, styrenes alkylated in the side chain, e.g. α-methylstyrene, and nuclear-substituted styrenes e.g. vinyltoluene and ethylvinylbenzene. The monovinyl-aromatic and monovinylidene-aromatic compounds may also be employed as mixtures with one another. Preferably, however, styrene is employed by itself. The radial block copolymer in general contains from 20 to 50% by weight, especially from 25 to 35% by weight, based on the branched block copolymer, of the monovinyl-aromatic or monovinylidene-aromatic compounds and, accordingly, from 80 to 50% by weight, preferably from 75 to 65% by weight, based on the branched block copolymer, of butadiene, as copolymerized units. The butadiene-based polymer blocks in the middle position are hydrogenated polybutadiene blocks which had a 1,2-vinyl content of from 30 to 70% by weight, preferably from 40 to 65% by weight, prior to hydrogenation.

The rubbery, radial block copolymers to be employed according to the invention in particular have the general formula

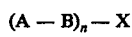

$$(A - B)_n - X$$

where A is a non-elastomeric polymer block of the monovinyl-aromatic or monovinylidene-aromatic compound, B is an elastomeric hydrogenated polybutadiene block, $n$ is an integer of not less than 3 and X is the radical of a polyfunctional coupling agent, by means of which the branches (A—B) of the block copolymer are chemically bonded to one another.

The radial block copolymers can be manfactured by conventional methods entailing successive polymerization of the monomers in solution in the presence of a monolithium-hydrocarbon as the initiator, subsequent coupling of the resulting active, living linear block copolymers with a polyfunctional, reactive compound as the coupling agent, and, thereafter, selective hydrogenation of the olefinic double bonds of the resulting radial block copolymer. Suitable monolithium-hydrocarbon initiators are those of the general formula RLi, where R is an aliphatic, cycloaliphatic, aromatic or mixed aliphatic-aromatic hydrocarbon radical of 1 to 12 carbon atoms and in particular is an aliphatic hydrocarbon radical. Examples which may be mentioned are ethyl-lithium, n-, sec.- and tert.-butyl-lithium, isopropyl-lithium and phenyl-lithium, of which n-butyl-lithium and sec.-butyl-lithium are particularly preferred.

Suitable solvents for the manufacture of the block copolymers are normally inert aliphatic, cycloaliphatic or aromatic hydrocarbons, e.g. n-hexane, heptane, isooctane, cyclohexane, cycloheptane, benzene and toluene. The polymerization is carried out in the presence of small amounts of polar solvents, e.g. amines, alcoholates and especially ethers, e.g. tetrahydrofuran, dimethoxyethane, phenyl methyl ether and others. The polar solvents are in general employed in amounts of from 0.05 to 10% by weight, preferably from 0.1 to 2% by weight, based on the total solvent. The polymerization is carried out under the conventional conditions for anionic polymerization using lithium-organic compounds, e.g. in an inert gas atmosphere, with exclusion of air and moisture. The polymerization temperatures are in general from 0° to 150° C and are preferably maintained at from 20° to 100° C.

To manufacture the radial block copolymers, the monovinyl-aromatic or monovinylidene-aromatic compounds are first polymerized by means of the monolithium-hydrocarbons until the monomers have been practically completely converted, and thereafter the butadiene is added to the solution of the resulting active, living polymers and added onto the active chain ends of the preformed living polymers of the monovinyl-aromatic or monovinylidene-aromatic compounds, to form the polybutadiene blocks. After completion of the polymerization, but before the deactivation of the initiator, a polyfunctional reactive compound is added, as a coupling agent, to the reaction solution. The polyfunctional coupling agent used should be at least trifunctional, i.e. it should be capable of linking at least three, or more, of the preformed active linear block copolymers at their terminal lithium-carbon bonds, to form a chemical bond so as to result in a single coupled and hence radial block copolymer. The manufacture of such branched block copolymers by coupling is described, for example, in British Pat. No. 985,614.

Suitable coupling agents are the conventional polyfunctional compounds, e.g. polyepoxides, such as epoxidized linseed oil, polyisocyanates, polyhalides, polyketones, polyanhydrides, compounds containing ester groups, especially dicarboxylic acid esters, e.g. diethyl adipate, and polyvinyl-aromatic compounds, especially divinylbenzene. The polyfunctional coupling agent is in general added to the reaction solution in amounts which are equivalent to the amount of initiator employed. The coupling can be carried out at the same temperature as the polymerization and is preferably carried out in the range of from 20° to 100° C.

After the coupling reaction, and advantageously before isolating the reaction product from the reaction solution, the olefinic double bonds of the radial block copolymers obtained are selectively hydrogenated. The selective hydrogenation can also be carried out by conventional methods using molecular hydrogen and catalysts based on metals or salts of metals of group 8 of the periodic table, as disclosed, for example, in U.S. Pat. No. 3,113,986, German Published Application DAS 1,222,260, German Laid-Open Application DOS 2,013,263 or U.S. Pat. No. 3,700,633. According to these references, the selective hydrogenation of the olefinic double bonds is preferably carried out in a homogeneous phase, using catalysts based on salts, especially the carboxylates, enolates or alkoxides, of nickel, cobalt or iron, which have been reduced with metal alkyls, especially aluminum alkyls at hydrogen pressures of from 1 to 100 bars and at from 25° to 150° C.

The selective hydrogenation is taken to the point where the content of olefinic double bonds in the radial block copolymers has been reduced to a residual proportion of less than 5%, preferably less than 2%. The residual proportion of olefinic double bonds is determined by a Wijs titration or by analysis by IR spectroscopy. In particular, the hydrogenation is carried out until the olefinic double bonds have been virtually completely reduced. Preferably, the hydrogenation is carried out in such a way that the aromatic double bonds of the star-shaped branched block copolymer are not attacked.

The mean molecular weight of the rubbery, radial block copolymers of the general formula $(A-B)_n-X$, which are to be employed according to the invention, is from 30,000 to 300,000 and preferably from 50,000 to 120,000. Each non-elastomeric polymer block A of the monovinyl-aromatic or monovinylidene-aromatic compound as a rule has a means molecular weight of from 1,000 to 25,000, preferably from 5,000 to 12,000, and each elastomeric hydrogenated polybutadiene block B as a rule has a mean molecular weight of from 5,000 to 50,000, preferably from 10,000 to 30,000. The stated molecular weights are the number-average molecular weights, determined by measuring the osmotic pressure. The number $n$, which is a measure of the degree of coupling and hence of the degree of branching, is preferably from 3 to 10 and especially 3 or 4.

Suitable tackifier resins (component $b$) for the adhesive composition of the invention are the conventional materials of this type, as described, inter alia, in the references cited at the outset. They include, for example, unmodified and modified rosin, particularly advantageous results being obtained with esters of rosin with polyhydric alcohols, such as glycerol rosin ester or pentaerythritol rosin ester. The use of hydrogenated rosin derivatives is particularly advantageous. Further tackifier resins which may be used are the conventional α- or β-pinene resins having a molecular weight of from 100 to 2,000, synthetic polyterpene resins and aliphatic diene-olefin-hydrocarbon resins having a molecular weight of from 500 to 3,000. Further groups of tackifier resins are the coumarone-indene resins, the polyindene resins and the phenol-modified resins. The molecular weights of these resins are in general from 200 to 1,500. Further tackifiers which may be used are the conventional resins based on styrene or substituted styrenes having a low or medium molecular weight, e.g. of from about 300 to 6,000. Examples of these are polystyrene resins, isobutylene/styrene copolymers and vinyltoluene/styrene copolymers. A further possible tackifier is polyisobutylene having a molecular weight of from 1,000 to 50,000, determined by the Staudinger method.

The tackifier resins are employed in an amount of from 25 to 300 parts by weight, preferably from 100 to 200 parts by weight, per 100 parts by weight of the rubbery, radial block copolymer (component $a$). The various tackifier resins may be used separately or in combination with one another.

As an optional further component $c$, the adhesive composition of the invention may contain a rubber extender oil in amounts of up to 200 parts by weight per 100 parts by weight of the rubbery branched block copolymer. Preferably, from 10 to 100 parts by weight of the extender oil are employed per 100 parts by weight of the branched block copolymer. The term rubber extender oil embraces not only the conventional extender oils obtained from petroleum fractions but also olefin oligomers and low molecular weight polymers, and vegetable and animal oils and their derivatives. The petroleum fractions which can be used as extender oils are high-boiling mineral oils having a controllable hydrocarbon composition and a variety of viscosities. They range from paraffin hydrocarbons through naphthenes to hydrocarbons of high aromatics content. Preferred extenders are mineral oils, obtained from petroleum fractions, which contain only a small proportion of aromatic hydrocarbons. Preferably, the latter proportion is less than 30% by weight, especially less than 15% by weight, of the mineral oil. A composition of mineral oil of from 30 to 50% by weight of naphthene hydrocarbons and from 35 to 65% by weight of paraffin hydrocarbons, the remainder being aromatic hydrocarbons, is particularly advantageous. The specific gravities of the mineral oils (at 15° C) are from about 0.80 to 1,00 g/ml, preferably from 0.83 to 0.91 g/ml; the viscosity of the oils is in general from about 10 to 100 cSt at 50° C. The boiling range of the mineral oils is in general above 270° C.

Furthermore, conventional adjuvants may be admixed to the adhesive composition of the invention. These additives in particular include antioxidants, e.g. zinc dibutyl-dithiocarbamate, sterically hindered phenols, 2,5-di-tert.-amyl-hydroquinone or chelate-forming phosphites, stabilizers, pigments, plasticizers, fillers or modifiers, e.g. waxes, especially paraffin waxes. The conventional amounts of the additives are incorporated into the adhesive composition. If antioxidants are added, their amount is, for example, from 0.1 to 3% by weight, based on the adhesive composition.

The adhesive composition of the invention is prepared by mixing the individual components. This mixing may be carried out in the conventional manner using a solvent which must subsequently be removed, or, advantageously, in the melt in the absence of a solvent. The latter process is preferably carried out at from 140° to 230° C. It is advantageous to take a part of the extender oil, or, if the composition contains little or no extender oil, a part of the tackifier resins, with or without the antioxidant, and then progressively to add the branched block copolymer. As soon as a homogeneous mixture has been obtained, the remaining oil and/or resin is added. In order to manage with very short mixing times, it may be advantageous to pre-swell the branched block copolymer in the extender oil prior to the mixing operation. It is also advantageous to add the branched block copolymer in the form of very small particles. Conventional units, e.g. kneaders, extruders or stirred vessels, are used for mixing the components.

The pressure-sensitive adhesive composition of the invention may be applied to suitable substrates from the melt, using conventional hot-melt adhesive applicators, e.g. by calendering or extrusion through slot dies, e.g. by the Bolten-Emerson system. The expensive solvent coating systems are therefore not needed in the present case. Examples of suitable substrates are plastic sheets or films, textile fabrics of man-made or natural fibers, nonwovens, paper, wood, glass, metals, rubber, bitumen coatings and bituminized board. Examples of plastics, in this context, are polyolefins, e.g. polyethylene or polypropylene, polyvinyl chloride, polyethylene glycol terephthalate and polystyrene. In order to apply the compositions to heat-sensitive films, the transfer process is used, i.e. a film of the adhesive composition is first applied to silicone paper and is transferred, after it has cooled, onto the plastic film.

The hot-melt adhesive mixtures which have been described may in particular be used as pressure-sensitive adhesives for the manufacture of self-adhesive materials, for example self-adhesive films, self-adhesive labels, self-adhesive floor coverings, self-adhesive wall coverings, medical sticking plasters and self-adhesive sound and vibration dampening materials.

Because of the use of the rubbery, radial block copolymer the adhesive compositions of the invention have high resistance to aging and oxidation, and a low melt viscosity. Their adhesive properties are particularly distinguished by high cohesion and excellent peel strength of the bonds obtained. It was surprising that adhesives having these good properties could be obtained by using the branched block copolymers of the invention, particularly since, according to the disclosure of German Laid-Open Application DOS 2,246,036, which describes the use of similar block copolymers, it is necessary to employ two carefully matched tackifier resins in order to obtain pressure-sensitive adhesives having satisfactory properties.

The Examples which follow illustrate the invention. Unless stated otherwise, parts and percentages are by weight. The molecular weights quoted are determined by measuring the osmotic pressure in a membrane osmometer.

In the Examples, 40 $\mu$m thick polyethylene glycol terephthalate films are coated with a 25 $\mu$m thick film of pressure-sensitive adhesive. The latter may be applied to the polyethylene glycol terephthalate film from the melt or from solution (for example in toluene). If a solvent is used, it is necessary to evaporate it under reduced pressure. During evaporation, the temperature of the coated film should not be raised to above about 130° C. In order to assess the adhesive properties of the film coated with the pressure-sensitive adhesive, the material is dried at room temperature and the surface tack is determined by means of the peel test. Furthermore, the cohesion of the adhesive layer is determined by means of the shear test.

In the peel test, 2 cm wide test strips are adhered to a chromed sheet and peeled off parallel to the adhesive layer, i.e. at an angle of 180°, the force required being measured. The pull-off speed is 300 mm/min. The measurement is carried out 24 hours after having adhered the strips to the sheet.

The shear test is carried out by the method described in German Laid-Open Application DOS 2,134,688. The test strips are adhered to a high gloss chromed sheet, the area of the adhesive bond being 20 × 25 mm. The sheet carrying the test strips is clamped in vertical disposition. The end of the adhesive strip is located with 1,000 g and the time required for the bond to break under the resulting constant tensile stress is determined. The measurement is carried out at 20° C and 50° C.

EXAMPLE 1

(a) Manufacture of the rubbery radial block copolymer:

145 g (1.4 moles) of purified styrene are polymerized in 2,000 g of cyclohexane and 17.7 g of tetrahydrofuran, using 21 mmoles of n-butyl-lithium, for one hour at from 45° to 50° C under an inert gas atmosphere, after which conversion is virtually complete. The molecular weight of the living polystyrene obtained is 7,000. 335 g (6.2 moles) of butadiene are then added and polymerized first at from 45° to 50° C and then for 2.5 hours at 60° C (polybutadiene block: Mn = 16,000). The living polymer is coupled by adding a stoichiometric amount of epoxidized linseed oil (Edenol B 316 of Messrs. Henkel). The molecular weight of the polymer after coupling is 70,000 and the 1,2-vinyl content of the polybutadiene phase is 57%. Hydrogenation is carried out using a homogeneous catalyst solution comprising 1 mmole of nickel acetylacetonate, dissolved in 30 ml of toluene, and 6 mmoles of aluminum-triisobutyl, at from 60° to 90° C and 5 bars. After the hydrogenation, the content of olefinic double bonds (determined by Wijs titration) is less than 2%. The polymer is precipitated by pouring the solution into alcohol and is filtered off and dried.

(b) Manufacture of a hot-melt adhesive mixture:

100 parts of the selectively hydrogenated, radial block copolymer, 175 parts of the glycerol ester of hydrogenated rosin, 25 parts of an extender oil (Catenex N 945 of Messrs. Shell) and 5 parts of zinc dibutyl-dithiocarbamate are homogenized in a kneader at mixing temperatures of about 200° C. To carry out this process, the rosin ester of glycerol and the antioxidant are first introduced into the kneader and the branched block copolymer, swollen with the extender oil, is then added slowly. The adhesive composition obtained is tested as described above. The rest results are shown in the Table.

EXAMPLE 2 (FOR COMPARISON)

The procedure followed is as in Example 1, but in this case hydrogenation after the coupling reaction is dispensed with so that a corresponding non-hydrogenated radial block copolymer is employed for the manufacture of the adhesive composition. The results obtained are to be found in the Table.

EXAMPLE 3 (FOR COMPARISON)

The adhesive composition is manufactured as in Example 1, but instead of the selectively hydrogenated radial block copolymer, 100 parts of a selectively hydrogenated linear block copolymer of the polystyrene/hydrogenated polybutadiene/polystyrene type are employed. This selectively hydrogenated linear block copolymer corresponds, in molecular weight, styrene content, 1,2-vinyl content and proportion of olefinic double bonds after hydrogenation, to the selectively hydrogenated radial block copolymer used in Example 1. The adhesive composition has the properties shown in the Table.

TABLE

| Example | Ex. 1 | Ex. 2 | Ex. 3 |
| --- | --- | --- | --- |
| Peel strength after 24 hours (N/2 cm) | 20.0 A$^+$ | 20.5 A$^+$ | 12 A$^+$ |
| Shear strength (hrs) at 20° C | >24 | >24 | >24 |
| at 50° C | >24 | 1.5 | >24 |

$^+$A denotes "adhesion rupture"

We claim:

1. A hot-melt pressure-sensitive adhesive composition consisting essentially of a mixture of
   (a) 100 parts by weight of a rubbery radial block copolymer with terminal non-elastomeric polymer blocks of a monovinyl-aromatic or monovinylidene-aromatic compound and butadiene-based elastomeric polymer blocks in the middle position, the olefinic double bonds of the block copolymer having been reduced to a residual content of less than 5 percent by selective hydrogenation and the elastomeric polybutadiene blocks having had, prior to hydrogenation, a 1,2-vinyl content of from 30 to 70 percent by weight, and the number-average molecular weight of the branched block copolymer being from 30,000 to 300,000,
   (b) from 25 to 300 parts by weight of a tackifier resin and
   (c) from 10 to 100 parts by weight of a rubber extender oil.

2. An adhesive composition as set forth in claim 1, wherein the rubbery radial block copolymer contains from 20 to 50 percent by weight, based on the block copolymer, of the monovinyl-aromatic or monovinylidene-aromatic compound as copolymerized units.

* * * * *